United States Patent
Huo et al.

(10) Patent No.: US 7,973,094 B2
(45) Date of Patent: Jul. 5, 2011

(54) LASER IRRADIATION OF METAL NANOPARTICLE/POLYMER COMPOSITE MATERIALS FOR CHEMICAL AND PHYSICAL TRANSFORMATIONS

(75) Inventors: Qun Huo, Orlando, FL (US); Jianhua Zou, Oviedo, FL (US); Hui Chen, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 300 days.

(21) Appl. No.: 11/770,279

(22) Filed: Jun. 28, 2007

(65) Prior Publication Data

US 2008/0004364 A1    Jan. 3, 2008

Related U.S. Application Data

(60) Provisional application No. 60/817,519, filed on Jun. 29, 2006.

(51) Int. Cl.
*B05D 3/06* (2006.01)
*C08F 290/06* (2006.01)
*B29C 25/08* (2006.01)

(52) U.S. Cl. ............. 522/2; 522/81; 264/400; 427/554; 156/272.8

(58) Field of Classification Search ................ 522/2, 81; 606/8; 428/156, 172; 156/272.8; 264/400; 427/554
See application file for complete search history.

(56) References Cited

U.S. PATENT DOCUMENTS

| | | | |
|---|---|---|---|
| 4,572,843 A * | 2/1986 | Saito et al. ................ | 427/554 |
| 2002/0117066 A1 * | 8/2002 | Kawamura et al. .......... | 101/462 |
| 2002/0172888 A1 * | 11/2002 | Huang et al. ............. | 430/270.1 |
| 2003/0015509 A1 * | 1/2003 | Gaissinsky et al. ....... | 219/121.85 |
| 2003/0093092 A1 * | 5/2003 | West et al. ............... | 606/139 |

* cited by examiner

*Primary Examiner* — Mark Eashoo
*Assistant Examiner* — Jessica Paul
(74) *Attorney, Agent, or Firm* — Jetter & Associates, P.A.

(57) ABSTRACT

A metal nanoparticle supported on or dispersed in a polymer is irradiated with photons from a laser source to address the nanoparticles. The polymer is transmissive to the photons and addressed nanoparticles transform the energy of the photon to heat which is transferred to a material in the vicinity of the nanoparticle. The locally heated material undergoes a physical or chemical transformation upon heating. The transformed material can be a material in the proximity of the metal nanoparticle supported polymer or metal nanoparticle/polymer composite. In this manner thermally induced physical or chemical transformations can be carried out in very small volumes of material without significant heating to the bulk of the material.

11 Claims, 1 Drawing Sheet

LASER IRRADIATION OF METAL NANOPARTICLE/POLYMER COMPOSITE MATERIALS FOR CHEMICAL AND PHYSICAL TRANSFORMATIONS

CROSS-REFERENCE TO RELATED APPLICATIONS

The present application incorporates by reference and claims priority to U.S. Provisional Patent Application Ser. No. 60/817,519 filed Jun. 29, 2006, entitled "Laser Irradiation of Metal Nanoparticle/Polymer Composite Materials for Chemical Reactions and Microprocessing Applications Therefrom."

STATEMENT REGARDING FEDERALLY SPONSORED RESEARCH OR DEVELOPMENT

The U.S. Government may have certain rights to the invention based on National Science Foundation Career Award DMR 0239424 and 0552295, and NIRT award DMI 0506531.

FIELD OF THE INVENTION

The present invention is related to the photo-thermal conversion by metal nanoparticles as a thermal energy source for chemical and physical transformations in a contacting medium.

BACKGROUND OF THE INVENTION

Many chemical reactions and physical processes require heating to trigger or advance the reaction or process. Heating is generally applied to a large volume in which the chemical reagents or workpiece is present.

However, localized heating for certain applications is known. For example, laser ablation using focused laser beams for polymer and doped polymer materials has been widely used for the fabrication of microfluidic channels, optical devices such as waveguides, optical switch, optical memory devices, MEMS packaging and many other significant applications. In these applications, laser irradiation introduces photochemical and/or photothermal effects on the polymer, leading to the deformation or decomposition of the polymer material. To extend the range of polymers that may be processed by laser irradiation, dye molecules with strong absorption at certain wavelength ranges are often added to the polymer as photon-thermal energy converters. The thermal energy released by the dye molecules is transferred to the polymer matrix. For most of the existing laser ablation processes, open channels or holes are generated on the polymer or composite substrate materials due to the complete decomposition of polymer molecules upon photoirradiation.

Recently, the photon-thermal energy conversion property of gold nanoparticles has attracted an interest from the scientific community. Gold nanoparticles with core diameters in the tens of nanometers are known to exhibit a strong surface plasmon resonance absorption band at visible light range around 520 nm. The photon capture cross-sections of nanoparticles are four to five orders of magnitude greater than those of photothermal dyes. For example, gold nanospheres with a diameter of 40 nm have a calculated absorption cross-section of $2.93 \times 10^{-15}$ m$^2$, which corresponds to a molar absorption coefficient $\epsilon$ of $7.66 \times 10^9$ M$^{-1}$ cm$^{-1}$ at a plasmon resonance wavelength maximum $\lambda_{max}$ of 528 nm. This value is five orders of magnitude higher than the molar extinction coefficient of indocyanine green ($\epsilon = 1.08 \times 10^4$ M$^{-1}$ cm$^{-1}$ at 778 nm).

The photon-thermal energy conversion property of gold nanoparticles is currently being explored for biological applications such as photothermal destruction of cancer cells, bacteria and β-amyloid plaques. For example, a paper entitled "Synergistic enhancement of selective nanophotothermolysis with gold nanoclusters: potential for cancer therapy" by Zharov et al. Lasers Surg Med. 2005; 37 (3):219-26 (ISSN: 0196-8092) discloses an approach that enhances selective photothermolysis of a tumor through laser activation of synergistic phenomena around nanoclusters, which are self-assembled into cancer cells. In vitro verification of this approach was performed by laser pulse irradiation (420-570 nm and 1064 nm; 8-12 nanosecond; 0.1-10 J/cm$^2$) of MDA-MB-231 breast cancer cells targeted with primary antibodies to which 40-nm gold nanoparticles were selectively attached by means of secondary antibodies. The assembly of gold nanoclusters on the cell membrane was found to be accompanied by increased local absorption and red-shifting as compared to cells that did not have nanoclusters. These effects were amplified by a silver-enhancing kit and pre-irradiation of cells with low laser-pulse energy. Finally, a significant increase in laser-induced bubble formation and cancer cell killing was observed using near-IR lasers (1064 nm). A cancer cell antigen was used to provide target specificity for nanoclusters formation making the cancer cells sensitive to laser activation.

It would be advantageous to be able to apply photo-thermal conversion by metal nanoparticles for chemical reactions and physical processing of materials. For these applications, metal nanoparticles are embedded in the chemical reaction media or the materials to be processed in a supported or non-supported format. Regarding chemical reactions, simply running a chemical reaction aided by a light source and metal nanoparticles in solution with the reagents does not provide useful results due to several unsolved issues. One important unsolved issue is stability of the nanoparticles during chemical reaction initiation. Another unsolved issue is how to eliminate the nanoparticles from the reaction mixture or product after the chemical reaction is completed.

SUMMARY OF THE INVENTION

A method of laser addressed localized heating of a material to undergo chemical or physical transformations involves the immobilizing of metal nanoparticles on a polymer support to form a nanoparticle coated support or physically dispersing metal nanoparticles within a polymer to form a nanoparticle/polymer composite, where the polymer is optically transmissive to the operating wavelength or wavelength range provided by the laser, with the material in proximity to the coated support or composite. By irradiating the coated support or composite with photons from the laser source to address metal nanoparticles, the energy of the photons are converted to heat and transferred to the proximal material promoting a thermally induced physical or chemical transformation of the material. The metal nanoparticles can be supported on a polymer beads or a polymer membrane such as an ion exchange resin. Alternately, the metal nanoparticles can be dispersed in a thermoplastic or thermoset polymer as a composite. The metal nanoparticles preferentially comprise gold.

The transformation can be a chemical reaction to a material that includes at least one diffusible chemical reagent in a liquid or solution state. The transformed material can be separated from the nanoparticle support or nanoparticle composite by methods including filtration. In one embodiment, the material can be in a solution where the solvent for the transformed product or a solvent for the product can be added after transformation.

The transformation can be a physical change of state of the material. The material can be a solder where a small amount of solder is melted by localized transfer of heat from addressed metal nanoparticles.

A system of photon energy to heat conversion for localized heating comprises at least one laser that can selectively address metal nanoparticles which are supported upon or dispersed within a polymer that is optically transmissive to the photons from the laser source so that the addressed nanoparticles generate heat in the vicinity of the addressed nanoparticle.

BRIEF DESCRIPTION OF THE DRAWINGS

A fuller understanding of the present invention and the features and benefits thereof will be obtained upon review of the following detailed description together with the accompanying drawing, in which.

DETAILED DESCRIPTION

Figure 1:
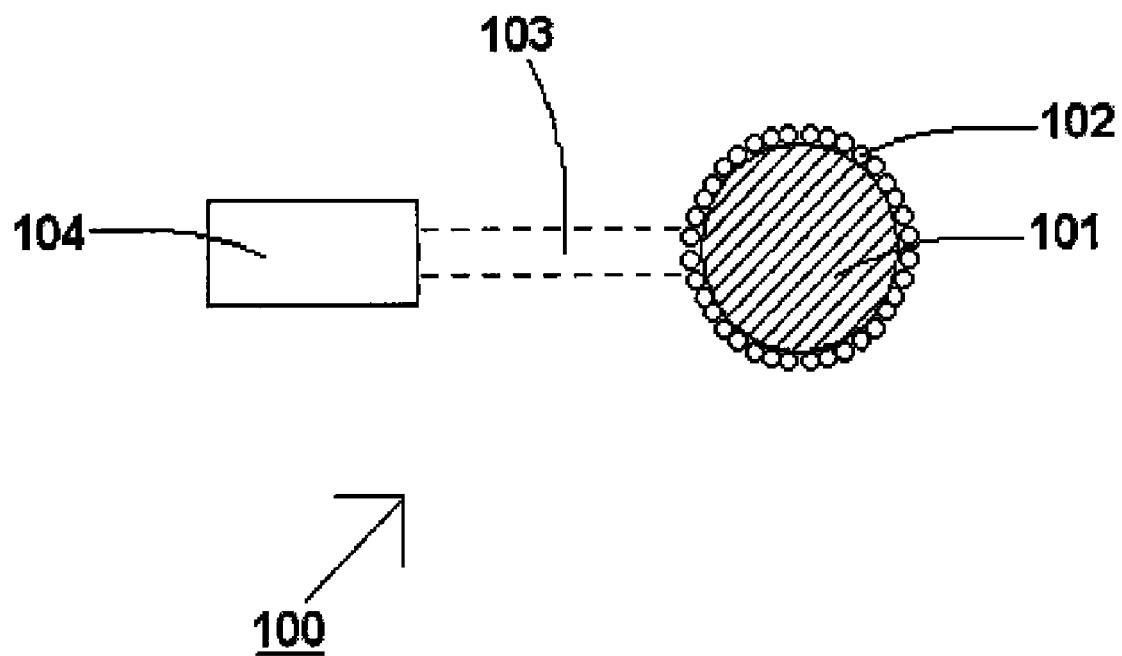
FIG. 1 shows where the components of a system according to one exemplary embodiment of the invention for the convert of energy of the photons provided by a laser beam from a laser source is absorbed by a metal nanoparticle supported on a polymeric bead and converted into heat.

A method of laser processing comprises the steps of immobilizing a plurality of metal nanoparticles on a polymer support to form a nanoparticle coated support or physically dispersed metal nanoparticles in a polymer to form a nanoparticle/polymer composite. The polymer is optically transmissive at a given operating wavelength range. At least one material is placed in proximity to the coated support or the composite. The coated support or composite is irradiated with photons in the operating wavelength range by a laser source. The metal nanoparticles preferentially absorb the photons from the laser and transfer heat to the material in the vicinity of the nanoparticle. The localized heat is absorbed by the material promoting a chemical or physical transformation of that material. The coated support or composite can then be removed from the chemically or physically transformed material. Accordingly, the transformed material can be separated from the metal nanoparticles or the polymer support. The heat generated by laser irradiation of the nanoparticles is transferred to the surrounding material, causing physical (such as deformation, melting, crystallizing) or chemical (such as decomposition, isomerization, unimolecular or bimolecular reactions) transformations. These transformations can result in an optical property changes (such as refractive index change) of a contacting material to create useful micropatterns or microstructures on or within the material.

FIG. 1 shows an exemplary system 100 for the conversion of laser light energy to heat in a localized volume according to one embodiment of the invention. A laser source 104 provides energy in the form of photons in a laser beam 103 that is directed to metal nanoparticles 102 that are supported on a polymeric resin 101. The resin of system 100 can be placed in a reaction vessel with a material for a chemical transformation. In one embodiment, upon exposure of the material to the heat that is generated when metal nanoparticles absorb photons from the laser beam, the material undergoes a thermally promoted reaction. For example a vinyl monomer with a thermal initiator dispersed or dissolved in a solvent can undergo initiation in the vicinity of the laser beam addressed metal nanoparticle. The support can have any geometry. For example, in one embodiment, the support can be a polymeric membrane, or other polymeric material having a flat surface, where the material to be heated can be a flat material in contact with the flat metal nanoparticle supported on the membrane.

The polymer support can be selected from a variety of generally thermoplastic or thermoset polymers depending on the applications. For accelerating chemical reactions, nanoparticles are generally immobilized on thermoset polymers having high decomposition temperatures, generally in excess of 180° C. For other applications, such as direct laser writing of optical devices and microelectronics, the temperature increase of the polymer upon laser irradiation should be high enough to introduce the necessary optical or electrical property change, but low enough to prevent decomposition of the polymer.

A variety of metal nanoparticles may be used with the invention. Although described relative to Au nanoparticles, the invention may be practiced with other metal nanoparticles, including, for example, Ag, Pt, or Cu nanoparticles. Nanoparticles are preferably 1 to 100 nm is size and can be various shapes. The metal nanoparticle/polymer composite can be from 0.01 to 10 weight percent nanoparticles. For the purpose of the invention a metal nanoparticle is any nanoparticle with a surface that is essentially metallic. A thin oxide or nitride surface layer can exist on the metal surface. As such, a metal inorganic composite, such as a gold coated silica particle, is a metal nanoparticle of the invention.

The laser source is selected to provide irradiation at a wavelength in which the metal nanoparticles provide efficient absorption and scattering. For Au nanoparticles, 532 nm radiation provided by a Nd:YAG laser has been found to be efficiently coupled.

The invention can catalyze or accelerate a broadly defined group of chemical reactions. Chemical reactions can include any decomposition, isomerization, or other unimolecular or bimolecular reaction. Multiple reactions and repetitive reactions, such as polymerizations, can be carried out using systems according to the invention. The nanoparticle coated supports in the format of beads or films are generally suspended in the chemical reaction medium. Laser irradiation of the nanoparticle coated supports will generate heat around the addressed nanoparticle of the coated supports. When the heat is transferred to the reaction medium, the chemical reaction initiates. The region of heating is confined to a localized volume. Using the inventive system, chemical reactions that generally require significant heat to trigger the reaction (e.g. 200 to 400° C.) can be conducted where the bulk of the transforming material remains at a low temperature, for example room temperature, using a hand-held low power laser beam. The invention thus eliminates the need for hot plates, heating mantles or other conventional heating methods or equipment used for thermal energy-promoted chemical reactions. It also eliminates the need of water condensers or other cooling devices used in a typical chemical reaction apparatus to prevent the volatilization of the reaction solvents. This technique allows many chemical reactions to be conducted more conveniently and safely.

As noted in the Background, regarding chemical reactions, one cannot generally run a chemical reaction aided by a light source and metal nanoparticles in solution because of at least one of two unsolved issues. One unsolved issue is how to protect the nanoparticles from degradation during chemical reaction initiation. Another unsolved issue is how to separate the nanoparticles from the reaction mixture or product after the chemical reaction is completed. The present invention solves both of these previously unsolved issues.

As noted above, in one embodiment of the invention, the nanoparticles are immobilized on a thermally stable polymer support, such as polymer beads or polymer membranes. The nanoparticles can be non-covalently or covalently immobilized on to the polymer support. The nanoparticles can also be physically dispersed in a polymer to form a nanoparticle composite. The polymer is substantially transparent to the laser light and is selected to be stable throughout the temperature range required for the promoted reaction where the heat generated by the laser at the nanoparticles is transferred to the reaction medium in its proximity. By dissipating the heat from the nanoparticle into the surrounding environment, the nanoparticles and their support resist decomposition.

In a coated support embodiment, using, for example polymer beads or membranes to immobilize the nanoparticles, the supported nanoparticles can be easily removed from the reaction mixture by filtration. For soluble products the simple filtration is sufficient to separate the supported nanoparticles, for example the nanoparticle/polymer beads or polymer membrane, from the reaction product. For products that solidify during the reaction, a solvent that dissolves the product, but not the polymer of the support or composite, can be added before filtration. In some cases the product can be distilled from the polymer supported nanoparticles.

EXAMPLES

It should be understood that the Examples described below are provided for illustrative purposes only and do not in any way define the scope of the invention.

Laser Irradiation of Metal Nano Articles for Chemical Reactions

In one example, gold nanoparticles with diameter of 10 nm were immobilized on a cross-linked anionic exchange resin, AMBERLITE IRA-67™, by non-covalent bonds. The anionic exchange resin beads were a few hundred microns in diameter. The nanoparticle-loaded resin beads were suspended in a toluene solution of styrene monomer premixed with the thermal initiator 2,2'-azobis(2-methylpropionitrile (AIBN). The beads were irradiated with a 532 nm continuous wave Nd:YAG laser. The styrene polymerized into polystyrene after a few minutes of laser irradiation. The reaction was conducted in open air and no condenser was used in the reaction apparatus. The overall temperature of the reaction mixture remained at around room temperature. After the reaction, the anionic exchange resin beads were filtered from the polymer solution. Repeating the experiment without the nanoparticle-loaded resin did not result in polymerization. Neat styrene monomer also polymerized in the presence of the irradiated nanoparticle supported resin, but did not polymerize in the absence of the resin.

Laser-Assisted Controlled Heating of Solder Material

In a third example, a prophetic example, the photon-thermal energy conversion of nanoparticles is also used for controlled heating of solder materials. A nanoparticle/polymer composite film, having nanoparticles blended with the polymer, is applied on the surface of commercial solder wires or pastes that is lead-contained or lead-free. The polymer is a thermoset polymer that does not decompose at temperatures where the solder melts. The composite in contact with the solder can be irradiated by a laser beam. The heat generated from the laser excited nanoparticle/polymer composite transfers to the solder, causing localized heating and melting of the solder. Because the spot size of the laser beam is around a few hundreds of microns or smaller, very small amounts of solder can be applied to an electronic device in a controlled fashion. In other embodiments, nanoparticles can be immobilized by other transparent matrix materials such as a thermal conductive glass and used for the exemplary purposes as disclosed herein.

This invention can be embodied in other forms without departing from the spirit or essential attributes thereof and, accordingly, reference should be had to the following claims rather than the foregoing specification as indicating the scope of the invention.

The invention claimed is:

1. A method of laser addressed localized heating to promote chemical transformations of a material, comprising the steps of:
   immobilizing a plurality of metal nanoparticles on a polymer support to form a nanoparticle coated support or physically blending said metal nanoparticles with a polymer to form a nanoparticle/polymer composite, said polymer being optically transmissive in a given operating wavelength range;
   placing said material in proximity to said coated support or said composite, wherein said material is different from said polymer support or different from said polymer; and
   irradiating said coated support or said composite with photons in said operating wavelength range from a laser source,
   wherein said metal nanoparticles addressed by said laser preferentially absorb said photons and transfer heat to said material in proximity to said metal nanoparticles,
   wherein a thermally induced polymerization occurs to said material to form a polymerized product, and
   physically separating said coated support or said composite including said metal nanoparticles from said polymerized product.

2. The method of claim 1, wherein said metal nanoparticles comprises gold.

3. The method of claim 1, wherein said polymer support comprises polymer beads.

4. The method of claim 1, wherein said polymer comprises a thermoplastic or a thermoset polymer.

5. The method of claim 1, wherein said polymerized product comprises a liquid and said physically separating step comprises filtering said coated support or said composite including said metal nanoparticles from said polymerized product.

6. The method of claim 1, wherein said polymerized product comprises a solid, further comprising dissolving said polymerized product in a solvent and wherein said physically separating step comprises filtering said coated support or said composite including said metal nanoparticles from said polymerized product.

7. The method of claim 1, wherein said material comprise a liquid solution that undergoes said chemical transformation.

8. The method of claim 1, wherein said polymer support comprises a polymer membrane.

9. The method of claim 1, wherein said polymer comprises a thermoset polymer.

10. The method of claim 1, wherein said transfer of heat to said material results in a temperature between 200 and 400° C. to trigger said polymerization.

11. The method of claim 1, wherein said material comprises a monomer.

* * * * *